E. GOEKE.
DISINFECTANT SPRAYER FOR ANIMALS.
APPLICATION FILED APR. 27, 1908.

932,858.

Patented Aug. 31, 1909.

Witnesses
A. G. Hague
F. C. Dahlberg

Inventor
Ernest Goeke
by Orwig & Lane attys

UNITED STATES PATENT OFFICE.

ERNEST GOEKE, OF RHODES, IOWA.

DISINFECTANT-SPRAYER FOR ANIMALS.

932,858.

Specification of Letters Patent.  Patented Aug. 31, 1909.

Application filed April 27, 1908. Serial No. 429,557.

*To all whom it may concern:*

Be it known that I, ERNEST GOEKE, a citizen of the United States, residing at Rhodes, in the county of Marshall and State of Iowa, have invented a new and useful Disinfectant-Sprayer for Animals, of which the following is a specification.

The object of my invention is to provide a device of simple, durable, and inexpensive construction, provided with a padded lever so positioned that animals, such as hogs, will rub against it when annoyed by itching, such as is caused by parasites, and when said lever is thus rubbed, the device will be operated by the lever in such a manner as to permit a quantity of fluid contained in a tank to be sprayed over the animal as the animal is rubbing or pressing the pad under the lever, said liquid being of such a nature that it will tend to destroy the parasites on the animal, so that animals having parasites will actuate machinery that will spray the animals and thus destroy the parasites.

A further object is to provide a spraying device of this kind in which the fluid will be sprayed in measured quantities, to thereby avoid wasting the fluid.

My invention consists in the construction, arrangement and combination of the various parts of the device, whereby the objects contemplated are attained, as hereinafter more fully set forth, pointed out in my claims, and illustrated in the accompanying drawings, in which—

Figure 1:
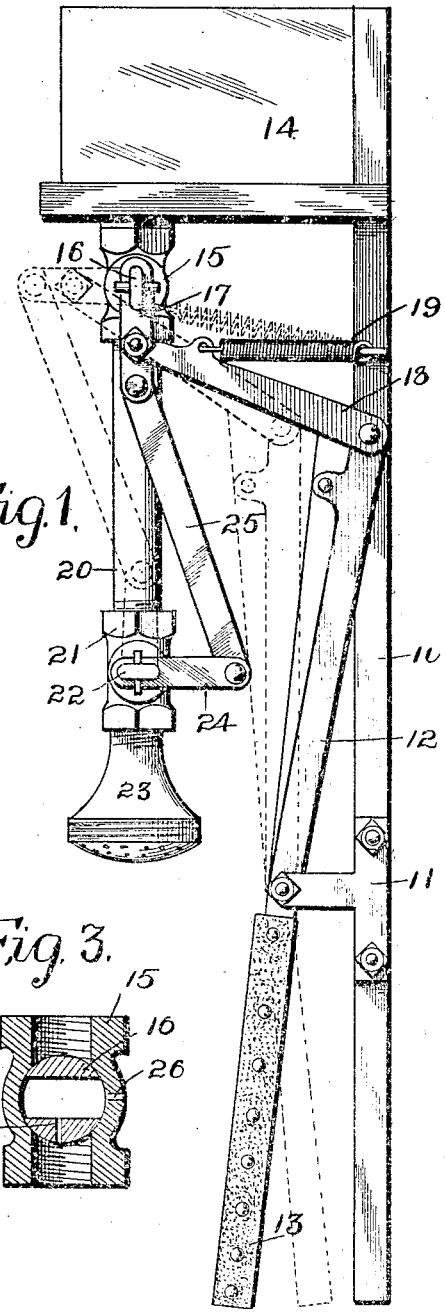
Figure 2:
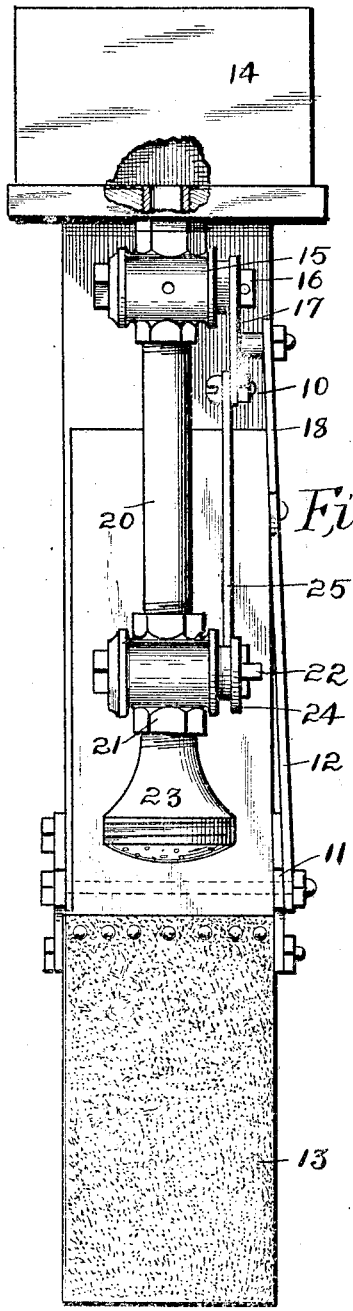

Figure 1 shows a side elevation of a device embodying my invention; the dotted lines in said figure showing the position of the padded lever and adjacent parts when the spraying valve is open. Fig. 2 shows a front elevation of same, and Fig. 3 shows an enlarged detail sectional view of the upper valve to illustrate the arrangement of the air inlet ports.

Referring to the accompanying drawings, I have used the numeral 10 to indicate the standard to which the spraying device is attached; this standard is provided with brackets 11 to which a padded lever 12 is fulcrumed; the lower end of this lever is provided with a pad 13, and this pad is preferably so positioned in an inclosure for animals that the animals may readily and easily rub their sides against said pad.

Figure 3:
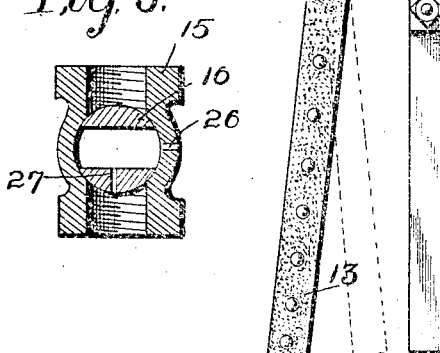

At the top of the standard 10 is a tank 14; a valve casing 15 is arranged in connection with the tank 14, and is provided with a valve 16, said valve being so arranged that when in one position as shown in Fig. 3, it will close the opening through the valve casing, and when in a position at right-angles thereto it will permit the passage of fluid through the valve casing; fixed to the valve 16 is a short lever 17, normally extended downwardly; this lever 17 is connected by a link 18 with the upper end of the lever 12, and a spring 19 is connected to said link to normally hold the upper end of the lever 12 toward the standard 10. Connected to the lower end of the valve casing 15 is a pipe 20 having at its lower end a valve casing 21 provided with a valve 22 of the same kind as the valve before described, and at the lower end of the valve casing 21 is a spraying nozzle 23. Attached to the valve 22 is a lever 24 normally extended horizontally toward the standard 10. The lever 17 and the lever 24 are connected with each other by means of a link 25 pivoted to both; the said link 18 being connected to the lever 17 above the point where the link 25 is connected to said lever, as clearly shown in Figs. 1 and 2.

In one side of the valve casing 15 is an air port 26, and in one side of the valve 16 is an air port 27. These air ports are so arranged that when the valve is closed, as shown in Fig. 3, the air ports 26 and 27 are out of alinement with each other and air may enter through the port 26 and then pass down through the port 27 so that the liquid contained in the pipe 20 may freely flow out through the nozzle 23; however, when the valve 16 is open, then the port 26 will be closed by the valve to prevent the escape of liquid through said port.

In practical use, assuming that the parts are assembled as shown in Figs. 1 and 2, then when an animal rubs against the pad lever 13, it will force the lower end of the lever toward the standard 10, as shown by dotted lines in Fig. 1. This will have the effect of moving the lever 17 to a position at right angles to its normal position and thereby close the valve 16; at the same time the link 25 and lever 24 will operate to open the valve 22, and hence, the liquid contained in the pipe 20 between the two valves will be permitted to pass out through the nozzle 23. The ports 26 and 27 serve to admit air at the top of the pipe 20, so that the liquid may freely flow out through the nozzle 23 and thus spray the animal that is rubbing against the padded lever. The closing of the upper valve serves to measure the quantity of liquid delivered during any one operation of the lever 12, so that the liquid is not wasted if an animal should stand in a position holding the padded end of the lever toward the standard 10. When the padded lever is in its normal position, the lower valve is closed and the upper one open, so that the pipe 20 will be refilled each time that the lever 12 is moved.

I have found that by placing in the tank 14 a liquid containing a parasite killing ingredient, animals, such as hogs, will when annoyed by parasites operate the lever 12 as required to discharge a quantity of the liquid upon themselves, and that the liquid thus sprayed upon the animals will flow downwardly over the backs of the animals and kill the parasites. I have discovered, also, that, by placing in the tank 14 a quantity of clear water, or by connecting said tank with a suitable water supply so that it may be constantly filled, animals will, during excessively hot weather, frequently operate the lever 12 and thus spray themselves with fresh water, thus reducing their temperature and enabling them to withstand excessively hot weather much better than they could do without access to water.

In a device of this kind it is desirable to provide a structure which will be actuated only by such animals as need to have a disinfectant or insecticide sprayed on them. It is well known that animals that have insects on their bodies or that have any disease that causes irritation of the skin, will rub against posts or the sides of buildings which are conveniently accessible to them, and that animals that do not have insects and that have no skin irritation will not do so. It is therefore one of the essential features of my invention to provide a spraying device so shaped and arranged that it will be actuated only by such animals from a herd or drove as are affected with irritation of the skin from any cause. Therefore, by providing an actuating lever arranged vertical with a support, and in a position where animals can conveniently rub against it from one side, I have provided a device that will be actuated only by such animals as need the spray.

I claim as my invention.

In a device of the class described, comprising a vertical support, a tank mounted on the top of the support, a spraying nozzle connected to the tank, valves for automatically measuring the liquid as it leaves the tank, brackets mounted on the vertical support, a substantially vertical lever provided with a roughened surface mounted in the brackets, means at the top of the lever for operating the measuring valves in the connection between the tank and spraying nozzle, a spring for holding said lever in its normal position, the arrangement of said valves allowing a measured quantity of liquid to spray upon the animal rubbing on the roughened surface of the vertical lever.

Des Moines, Iowa, April 4, 1908.

ERNEST GOEKE.

Witnesses:
S. F. KLEMME,
J. E. HOLMES.